United States Patent
Boeckler

[11] Patent Number: 5,906,788
[45] Date of Patent: May 25, 1999

[54] DUAL CURE, IN-MOLD PROCESS FOR MANUFACTURING ABRASION RESISTANT, COATED THERMOPLASTIC ARTICLES

[75] Inventor: Rudolph H. Boeckler, Grafton, Wis.

[73] Assignee: Cook Composites and Polymers Co., North Kansas City, Mo.

[21] Appl. No.: 07/956,114

[22] Filed: Oct. 5, 1992

[51] Int. Cl.⁶ .......................... B32B 27/16; B32B 27/30; B32B 31/00
[52] U.S. Cl. .......................... 264/492; 264/496; 264/255
[58] Field of Search ............................. 264/255, 22, 492, 264/496, 493

[56] References Cited

U.S. PATENT DOCUMENTS

| | | | |
|---|---|---|---|
| 4,041,120 | 8/1977 | Oshima et al. | 264/255 |
| 4,189,517 | 2/1980 | Shanoski et al. | 264/257 |
| 4,199,421 | 4/1980 | Kamada et al. | 264/22 |
| 4,308,119 | 12/1981 | Russell | 204/159 |
| 4,319,811 | 3/1982 | Tu et al. | 428/412 |
| 4,331,735 | 5/1982 | Shanoski | 264/255 |
| 4,377,457 | 3/1983 | Boeckeler et al. | 204/159 |
| 4,414,173 | 11/1983 | Cobbledick et al. | 264/255 |
| 4,689,243 | 8/1987 | Sasaki et al. | 264/22 |
| 4,800,123 | 1/1989 | Boeckeler | 428/423 |
| 4,830,803 | 5/1989 | Matsumaru et al. | 264/255 |
| 4,902,578 | 2/1990 | Kerr | 427/54 |
| 4,911,875 | 3/1990 | Vetter et al. | 264/255 |

*Primary Examiner*—Mathieu D. Vargot
*Attorney, Agent, or Firm*—Whyte Hirschboeck Dudek

[57] ABSTRACT

Laminated, molded plastic articles having an excellent abrasion resistant coating are prepared by a 2-step process including applying to a mold surface a 100% reactive coating composition, at least partially curing the coating composition, applying to the exposed surface of the cured coating composition a thermoplastic material, and curing the thermoplastic material to form the laminated molded article. The coating composition includes a polyfunctional acrylic monomer, such as dipentaerythritol monohydroxypentacrylate, a mono functional acrylic monomer, such as hydroxymethylacrylate, an acrylic-soluble thermoplastic, such as cellulose acetate butyrate, an aminoplast resin, such as melamine-formaldehyde, and a free radical initiator. The coating composition is at least partially cured by either UV or IR radiation.

20 Claims, No Drawings

DUAL CURE, IN-MOLD PROCESS FOR MANUFACTURING ABRASION RESISTANT, COATED THERMOPLASTIC ARTICLES

BACKGROUND OF THE INVENTION

This invention relates to coated, molded articles. In one aspect, this invention relates to coated, molded articles comprising a plastic laminated to an abrasion resistant coating while in another aspect, this invention relates to a dual cure, in-mold process for making these articles. In yet another aspect, this invention relates to molded, plastic articles coated with a composition comprising poly- and monofunctional acrylic monomers, acrylic-soluble thermoplastics having hydroxy functionality, and an aminoplast resin.

Molded thermoplastic articles, such as those made from polymethylmethacrylate, polycarbonate, polyester carbonates, polyester and polystryrene, are commonly used in a wide variety of applications including automotive head and tail lamps, glazing, optical lenses, aircraft parts, signs, display and store fixtures and furniture, to name but a few. Since the surfaces of these thermoplastics are quite soft and are easily scratched and marred during normal use, these surfaces are commonly treated with an abrasion resistant coating.

Many coatings have been proposed for post-application onto the finished molded articles. These materials are applied by conventional coating methods such as spraying, dipping, brushing and roll coating. One common type of a post-application coating is the solvent-based, thermally crosslinkable type, such as the polysiloxanes, fluorocarbon-vinyl ether copolymers, and polyurethanes. These materials, when cured, offer various degrees of abrasion resistance, gloss, weatherability, chemical resistance, and adhesion to the thermoplastic substrate. However, these materials suffer certain disadvantages, some serious, such as slow cure, high energy requirements to convert and/or eliminate solvent, emission of enviroment damaging solvents, and cosmetically undesirable features, e.g. orange peel, craters, fish eyes and the presence of airborne dust particles.

Another type of post-application coating is the 100% solids, UV radiation-curable coating type. These materials overcome some of the disadvantages associated with the solvent-based materials, such as high energy consumption and solvent emissions but because of their higher viscosities, they suffer even more from the previously described surface defects as well as poor adhesion to some thermoplastic compositions. These materials also have a tendency to stress crack when applied at higher film thickness. The addition of nonreactive thermoplastic polymers or monofunctional monomers can reduce or eliminate cracking, but only with a diminished resistance to abrasion, chemicals and weathering. In addition, the cure of these coatings by UV radiation is inhibited by atmospheric oxygen, and this results in lower molecular weight polymers at the surface and thus a coating with less hardness, abrasion resistance, chemical resistance, gloss and weatherability than would otherwise be the case. This inhibition can be overcome by conducting the cure in an inert atmosphere, but this is comparatively costly and impractical when the article is large and of a complex shape.

SUMMARY OF THE INVENTION

According to this invention, plastic articles having an abrasion resistant coating are prepared by a two-stage, in-mold curing process comprising the steps of:

A. Providing a mold having a surface corresponding to the article in negative relief;

B. Applying to at least a portion of the surface of the mold that is in negative relief a 100% reactive coating composition comprising:
  1. A polyfunctional acrylic monomer having at least three acryloloxy groups,
  2. A monofunctinal acrylic monomer,
  3. An acrylic-soluble thermoplastic having hydroxy functionality,
  4. An aminoplast resin,
  5. A free radical initiator, and optionally
  6. A blocked acid catalyst;

C. Curing the coating composition;

D. Applying to the cured coating composition an at least partially uncured thermoplastic composition to form a laminate;

E. Curing the laminate to form the plastic article; and

F. Removing the cured plastic article from the mold. In one embodiment of this invention, the free radical initiator is a photoinitiator, and the coating composition is cured by UV radiation. In another embodiment of this invention, the free radical initiator is an initiator system comprising a metallic salt drier, a polyallylic crosslinker-initiator, and optionally, a non-polyallylic peroxide initiator, and the coating composition is cured by heat (typically induced by IR radiation). In either cure embodiment, the laminated, molded plastic article exhibits a coating that has excellent abrasion resistance and adhesion to the plastic substrate, a smooth, blemish-free surface, and sufficient flexibility to resist thermal stress cracking even in those instances in which the coating is relatively thick.

DESCRIPTION OF THE PREFERRED EMBODIMENTS

The polyfunctional acrylic monomers used in the practice of this invention have at least three, and preferably at least five, acryloloxy groups, i.e.

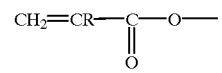

(where R is H or $CH_3$), and include the acrylic acid esters and methacrylic acid esters of polyhydric alcohols. Preferred polyfunctional acrylic monomers include the polyacrylates and methacrylates of pentaerythritol and dipentaerythritol such as pentaerythritol triacrylate, pentaerythritol tetraacrylate, dipentaerythritol monohydroxypentaacrylate, dipentaerythritol hexaacrylate, pentaerythritol trimethacrylate, and the like. These materials are further described in U.S. Pat. No. 4,902,578 and U.S. Pat. No. 4,800,123, both of which are incorporated herein by reference.

The monofunctional acrylic monomers used in the practice of this invention include any of the well known alkyl and cycloalkyl acrylates and methacrylates. Preferred monofunctional acrylic monomers are those monodfunctional monomers which bear hydroxy groups such as hydroxyethylmethacrylate, hydroxypropylmethacrylate, caprolactone acrylate, and caprolactone methacrylate. These materials are also further described in U.S. Pat. No. 4,902,578.

Any acrylic-soluble thermoplastic polymer that will readily condense at an elevated temperature with an aminoplast resin can be used in the practice of this invention. These polymers are characterized by the presence of hydroxy groups, good solubility in the poly- and monofunctional acrylic monomers and upon cure, the ability to impart clarity and flexibility to the coating. These polymers also improve the flow and leveling characteristics of the cured coating composition.

The molecular weights of these acrylic-soluble thermoplastic polymers can vary over a wide range, but in general are both low enough to provide good solubility in the monomers and reasonable solution working viscosity, and yet high enough to provide the desired flow, leveling and flexibility characteristics to the cured coating. Preferred are those thermoplastic polymers with a weight average molecular weight of at least 3,000, more preferably at least about 9,000. Preferably, the weight average molecular weight of these polymers does not exceed about 90,000. Exemplary polymers include the various cellulose esters, e.g. cellulose acetate butyrate, cellulose acetate propionate, and cellulose acetate, and the various polyesters and acrylics. These polymers are further described in U.S. Pat. No. 4,308,119 which is incorporated herein by reference.

Any aminoplast resin that condenses at an elevated temperature with the acrylic-soluble thermoplastic polymer and hydroxy functional monomer described above can be used in the practice of this invention. Exemplary resins include alkylated melamine-formaldehyde, urea-formaldehyde, benzoquanamine and glycouril, with the melamine-formaldehyde resins preferred. These resins do not participate to any significant extent in the first curing stage, namely the free radical cure, since the low or moderate temperatures reached for brief periods of time during this stage are insufficient to provide cure and to unblock the blocked acid catalyst (if present) which is used to catalyze the condensation reaction of the aminoplast resin.

Any acid catalyst that is blocked, i.e. inactive, at a temperature of less than about 200° F., preferably less than about 250° F., but will unblock, i.e. activate, at temperatures in excess of 200° F., preferably in excess of 250° F., to catalyze the condensation reaction of the aminoplast resin can be used in the practice of this invention to increase the rate of cure. Examples of these catalysts are blocked polymeric dodecylbenzene sulfonic acid ester, dinonylnapthalene disulfonic acid ester, and dinonylnapthalene disulfonic acid reacted with an epoxy resin. These catalysts are sold under the trademark NACURE by King Industries.

The free radical initiators that are used in the first stage UV cure embodiment of this invention include any of the well known UV photoinitiators such as benzophenone, acetophenone and its derivatives, benzoin, benzoin ethers, thioxanthones, halogenated compounds, oximes, and acyl phosphine oxides. Preferred are those photoinitiators which do no strongly discolor when exposed to sunlight, e.g. the acyl phosphine oxides and 2-hydroxy-2-methyl-1-phenyl propan-1-one.

The free radical initiators that are used in the first stage thermal cure embodiment of this invention are a system comprising a metallic salt drier, a polyallylic crosslinker-initiator, and optionally, a nonpolyallylic peroxide initiator Representative of the polyallylic crosslinker-initiators are polyester resins based on trimethylolpropane mono- or diallyl ethers and polyallylglycidyl ether alcohol resins Those crosslinker-initiators that function both as initiators for low temperature, free radical polymerization of the $\alpha,\beta$ ethylenically unsaturated mono- and polyfunctional monomers and as a multifunctional crosslinker are the preferred crosslinker-initiators. The polyallylic ethers, such as SANTOLINK XI-100 manufactured and sold by Monsanto Company, are representative of these preferred crosslinker-initiators.

Any metallic salt drier that will promote or accelerate the rate of cure of the mono- and polyfunctional monomers, acrylic-soluble thermoplastic having hydroxy functionality, and crosslinker-initiator can be used in the practice of this invention. Typical of these driers are salts of metals with a valence of two or more and unsaturated organic acids. Representative metals include cobalt, manganese, lithium, vanadium, copper, cerium, lead, iron, and zinc. Representative acids include linoleates, naphthenates, octoates, neodeconates, and resinates. Preferred metallic salt driers include the octoates, napthenates and neodeconates of cobalt, manganese, vanadium, potassium, zinc and copper. Especially preferred metallic salt driers are the cobalt- and manganese-based driers such as cobalt octoate, cobalt napthenate and manganese napthenate.

The rate of cure, especially at relatively low temperatures, e.g. 70–100° F., can be further accelerated through the use of one or more co-initiators. These co-initiators are typically non-polyallylic peroxides, and include any of the common peroxides such as benzoyl peroxide; dialkyl or aralkyl peroxides such as di-t-butyl peroxide, dicumyl peroxide, cumylbutyl peroxide, 1,1-di-t-butylperoxy-3,5,5-trimethylcyclohexane, 2,5-dimethyl-2,5-di-t-butylperoxy hexane and bis(alpha-t-butylperoxy isopropylbenzene); peroxyesters such as t-butylperoxy pivalate, t-butyl peroctoate, t-butyl perbenzoate, 2,5-dimethylhexyl-2,5-di(perbenzoate), dialkylperoxymonocarbonates and peroxydicarbonates; hydroperoxides such as t-butyl hydroperoxide, p-methane hydroperoxide, pentane hydroperoxide and cumene hydroperoxide; and ketone peroxides such as cyclohexanone peroxide and methyl ethyl ketone peroxide.

Other additives, such as fillers, thixotropic agents, rheological control additives, UV absorbers, solvents and the like, can be incorporated into the coating composition as desired.

The thermoplastic molding resins that can be used in the practice of this invention can vary to convenience Representative resins include acrylics, polycarbonates, vinyls, polyesters and polyurethanes. Preferred thermoplastic resins are those that readily polymerize at the temperatures of the second stage cure.

The relative amounts of the individual components present in the coating composition will vary with the nature of the first stage cure. If the first stage cure is by UV radiation, then typically the relative amounts, in weight percent based on the weight of the coating composition, are about:

| Component | Preferred | More Preferred |
| --- | --- | --- |
| Polyfunctional Monomer | 30–85 | 55–75 |
| Monofunctional Monomer | 10–40 | 10–20 |
| OH-Functional Thermoplastic | 2–15 | 4–10 |
| Aminoplast Resin | 5–20 | 7–12 |
| Blocked Acid Catalyst | 0.5–5 | 1–2 |
| UV Photoinitiator | 0.2–6 | 1–3 |

If the first stage cure is by heat, then typically the relative amounts, in weight percent based on the weight of the coating composition, are about:

| Component | Preferred | More Preferred |
| --- | --- | --- |
| Polyfunctional Monomer | 30–70 | 50–65 |
| Monofunctional Monomer | 10–40 | 10–20 |
| OH-Functional Thermoplastic | 2–5 | 4–10 |
| Aminoplast Resin | 5–20 | 7–12 |
| Blocked Acid Catalyst* | 0.5–5 | 1–2 |
| Crosslinker-Initiator | 5–25 | 10–20 |
| Metallic Salt Drier | 0.05–0.5 | 0.1–0.3 |
| Co-initiator | 0.2–3 | 1–2 |

*If present.

In the process of this invention for molding a laminated article comprising a plastic substrate and an abrasive resistant coating, a mold surface corresponding to the article in negative relief is at least partially, perferably completely; covered with the coating composition. Typically, this composition is formulated from its constituent components just prior to its application to the mold surface. The monomers, acrylic-soluble thermoplastic, aminoplast resin and blocked acid catalyst are blended with one another prior to the addition of the free radical initiator. If the initiator is a UV photoinitiator, then it can be blended with the other components at any time prior to exposing the uncured composition to UV radiation. If the initiator is a thermal cure system, then the metallic salt drier is mixed with the monomers, etc. prior to blending that mix with the crosslinker-initiator and, if present, co-initiator.

In those compositions in which a UV photoinitiator is employed, the coating is applied by any conventional technique at thicknesses ranging from about 0.05 to about 3 mil, preferably from about 0.2 to about 1 mil, and then it is exposed to UV radiation of wavelengths ranging from about 180 nm to about 450 nm. The sources of UV radiation include medium or high pressure mercury vapor lamps, metal halide lamps and xenon discharge lamps. Generally exposures of 1 to about 5 seconds are used to provide the first stage cure.

After UV curing, the coating is relatively soft, possibly even tacky, and is easily marred on the surface exposed to the atmosphere. Continued exposure to UV radiation does not significantly increase the hardness of the film.

For those compositions in which a thermally activated cure system is employed, the coating is applied in thicknesses ranging from about 0.05 mil to about 3 mil, preferably from about 0.2 mil to about 1 mil. The coating is then typically subjected to infrared radiation for 1 to about 5 minutes in order to complete the first stage cure. After curing, the coating is relatively soft, possibly even tacky, and is easily marred on the surface exposed to the atmosphere. The coating of this embodiment may also be cured simply by exposing it to heat.

After the first stage curing is complete, regardless of the method of cure, the thermoplastic material is applied, usually in the form of a syrup, to the exposed surface of the cured coating composition. This material can be applied in any conventional manner, e.g. spraying, brushing, injection, etc. The thermoplastic material is then subjected to a temperature of at least 140° F., preferably a temperature between about 160 and 300° F., for at least about 30 minutes, preferably at least about 60 minutes. Once this second stage curing is complete, the molded article is removed from the mold.

The mold may be an open mold or a matched mold, i.e. a two component mold comprising a female surface and a male surface that when joined, define a volume with the shape of the desired molded product. If an open mold, then once the plastic has been applied to the exposed surface of the cured coating composition, then it is cured as described above, typically by placing it an oven. If a matched mold, then once the coating composition has cured the mold is closed and the plastic injected under pressure into the mold to completely fill the volume formed by the two mated mold surfaces. The mold is retained in this closed position at the curing temperature for a sufficient period of time to allow the molded article to complete cure. The mold is then opened, and the molded article removed. Mold release agents can be used with both open and matched molds as desired.

In one embodiment of this invention, the plastic is fiber-reinforced. The reinforcing fiber can vary to convenience, and typical reinforcing fibers include glass, polyethylene, metal, ceramic and the like. While the fiber can be admixed with the plastic prior to the application of the plastic to the cured coating composition, more commonly the fiber is applied to the cured coating composition as a preform Under this circumstance, the mold is usually a matched mold. The preform is inserted over the cured coating composition, the mold is closed, and the plastic injected. Upon cure, a fiber-reinforced plastic article is formed.

The laminated, plastic molded articles of this invention exhibit a coating film that has resistance to scratching with No. 00 steel wool, solvent resistance, and excellent adhesion to the thermoplastic substrate.

The following examples are illustrative of certain embodiments of this invention Unless indicated to the contrary, all parts and percentages are by weight.

SPECIFIC EMBODIMENTS

EXAMPLE 1

An abrasion resistant coating was prepared by combining 65 grams of dipentaerythritol monohydroxypentaacrylate (SR-399 from Sartomer Co.), 15 grams 98.0% purity grade 2-hydroxyethylmethacrylate, 10 grams of methylated melamineformaldehyde resin (Cymel 303 from the Monsanto Co.), 7.4 grams of cellulose acetate butyrate (CAB 551.01 from Eastman Chemical Co.), 1.5 grams polymeric dodeylbenzene sulfonic acid ester (Nacure XP-314 from King Industries) and 2 grams acyl phosphine oxide (Lucirin TPO from BASF Corp.).

The resulting solution was clear and had a viscosity of 2000 cps at 25° C.

This solution was applied with a glass rod to a clean, unwaxed glass plate at a film thickness of 1.2 mils.

The film was exposed for 1.5 seconds to ultraviolet radiation from a mercury vapor lamp with an output of 200 watts per inch. The resulting film had a very slight tack and marred easily.

A cell casting mold was constructed with the coated glass plate, a ⅛ inch thick Teflon® spacer and a clean uncoated glass plate. A thermoplastic syrup consisting of an acrylic resin, methylmethacrylate and a peroxide initiator was cast between the glass plates and the coated casting was placed in a oven held at 150° F. for 60 minutes. Then the coated casting was removed from the mold and post cured for 60 min at 250° F.

The resulting cast article had excellent clarity, was not scratched with No. 00 steel wool and was not removed or dulled by 100 double rubs with methyl ethyl ketone. The coating did not lose adhesion when crosshatched and subjected to No. 600 Scotch® Brand adhesive tape pull.

EXAMPLE 2

An abrasion resistant coating composition was prepared by combing 60 grams of dipentaerythritol monohydroxypentaacrylate, 0.2 grams of cobalt-potassium complex drier (Nuocure CK from Huls Corp.), 0.3 grams of methyl ethyl ketoxime, 15 grams 98.0% purity 2-hydroxyethyl-methacrylate, 7.4 grams cellulose acetate butyrate (CAB 551.01), 1.5 grams 2,5 dihydroxyperoxy-2, 5-dimethylhexane (Luperox 2,5-2,5 from Pennwalt Corp.), and 10 grams polyallylglycidyl ether crosslinker-initiator (Santolink XI-100 from Monsanto Co.)

This solution was applied at 1.2 mils to a clean, unwaxed glass plate and the film was exposed for 3 minutes to infrared radiation produced by a 100 watt per inch high intensity tungsten quartz tube.

The resulting film had a very slight surface tack.

A cell was constructed with the coated plate and acrylic syrup was cast as in Example 1. The coated casting was then cured in the mold for 12 hours at 140° F.

After demolding the resulting article was optically clear. The coated side was not scratched after 25 rubs with No. 00 steel wool and the coating was not removed by cross hatching and tape pulling.

EXAMPLE 3

An abrasion resistant coating was prepared by combining 65 grams dipentaerythritol monohydroxypentaacrylate, 18 grams 98.0 purity 2-hydroxyethylmethacrylate, 7.4 grams CAB 551.01, 10 grams Cymel 303 and 2.0 grams acyl phosphine oxide photoinitator.

1.0 mils of this solution were applied to a clean glass plate and subjected to UV radiation from as 200 watt per inch mercury vapor lamp for 15 seconds. The resulting film had a slight tack and marred easily.

Into the cell constructed with the coated glass plate, ⅛ inch Teflon® spacer and a clean, waxed glass plate was cast an acrylic syrup consisting of acrylic resin, methylmethacrylate and 2,2,'-azobis(2-methylpropane nitrile) initiator. The cell was placed in a 140° F. oven for 12 hours.

The resulting article was optically clear, and was not scratched on the coated side with No. 00 steel wool. The coating could not be removed by cross hatching and tape pulling.

While this invention has been described in considerable detail by the preceding examples, this detail is provided for the purpose of illustration only and is not to be construed as a limitation upon the invention as described in the following claims.

What is claimed is:

1. A two-stage, in-mold process for preparing a laminated thermoplastic article with an abrasion resistant coating, the process comprising the steps of:
    A. Providing a mold having a surface corresponding to the article in negative relief;
    B. Applying to at least a portion of the surface of the mold that is in negative relief a 100% reactive coating composition comprising:
        1. A polyfunctional acrylic monomer having at least three acryloloxy groups,
        2. A monofunctinal acrylic monomer,
        3. An acrylic-soluble thermoplastic having hydroxy functionality,
        4. An aminoplast resin, and
        5. A free radical initiator;
    C. At least partially curing the coating composition;
    D. Applying to the at least partially cured coating composition an at least partially uncured thermoplastic composition to form a laminate;
    E. Curing the laminate to form the plastic article; and
    F. Removing the cured plastic article from the mold.

2. The process of claim 1 in which the 100% reactive coating composition contains a blocked acid catalyst.

3. The process of claim 2 in which the polyfunctional acrylic monomer has at least five acryloloxy groups.

4. The process of claim 3 in which the monofunctional acrylic monomer is selected from the group consisting of alkyl and cycloalkyl acrylates and methacrylates.

5. The process of claim 4 in which the acrylic-soluble thermoplastic has a weight average molecular weight of at least about 3,000.

6. The process of claim 5 in which the aminoplast resin is a melamine-formaldehyde resin.

7. The process of claim 6 in which the blocked acid catalyst remains inactive at temperatures less than about 200° F.

8. The process of claim 1 in which the free radical initiator is a UV photoinitiator and the reactive coating composition is at least partially cured by UV radiation.

9. The process of claim 2 in which the free radical initiator is a UV photoinitiator and the reactive coating composition is at least partially cured by UV radiation.

10. The process of claim 7 in which the free radical initiator is a UV photoinitiator and the reactive coating composition is at least partially cured by UV radiation.

11. The process of claim 1 in which the free radical initiator is a system comprising a metallic salt drier, and a polyallylic crosslinker-initiator.

12. The process of claim 2 in which the free radical initiatior is a system comprising a metallic salt drier, and a polyallylic crosslinker-initiator.

13. The process of claim 7 in which the free radical initiatior is a system comprising a metallic salt drier, and a polyallylic crosslinker-initiator.

14. The process of claim 11 in which the crosslinker-initiator is a polyallylic ether, and the metallic salt drier is selected from the group consisting of the octoates, napthenates and neodeconates of cobalt, manganese, vanadium, potassium, zinc and copper.

15. The process of claim 12 in which the crosslinker-initiator is a polyallylic ether, and the metallic salt drier is selected from the group consisting of the octoates, napthenates and neodeconates of cobalt, manganese, vanadium, potassium, zinc and copper.

16. The process of claim 13 in which the crosslinker-initiator is a polyallylic ether, and the metallic salt drier is selected from the group consisting of the octoates, napthenates and neodeconates of cobalt, manganese, vanadium, potassium, zinc and copper.

17. The process of claim 14 in which the system includes a co-initiator.

18. The process of claim 1 in which the coating composition comprises, in weight percent based on the total weight of the coating composition, about:
    A. 30–85% polyfunctional monomer,
    B. 10–40% monofunctional monomer,
    C. 2–15% OH-functional thermoplastic,
    D. 5–20% Aminoplast resin, E. 0–5% Blocked acid catalyst, and F. 0.2–6% UV photoinitiator.

19. The process of claim 1 in which the coating composition comprises, in weight percent based on the total weight of the coating composition, about:

A. 30–70% polyfunctional monomer,

B. 10–40% monofunctional monomer,

C. 2–15% OH-functional thermoplastic,

D. 5–20% Aminoplast resin,

E. 0–5% Blocked acid catalyst,

F. 5–25% Crosslinker-initiator,

G. 0.05–0.5% Metallic salt drier, and

H. 0–3% Co-initiator.

20. The process of claim 19 in which the coating composition is cured by infrared radiation.

* * * * *

UNITED STATES PATENT AND TRADEMARK OFFICE
CERTIFICATE OF CORRECTION

PATENT NO. : 5,906,788

DATED : May 25, 1999

INVENTOR(S) : Rudolph H. Boeckeler

It is certified that error appears in the above-identified patent and that said Letters Patent is hereby corrected as shown below:

On the title page:

In the abstract [57], line 10: Replace "mono functional" with --monofunctional--.

Column 3, line 59: Between the words "resins" and "Those", insert a -- . --.

Column 5, line 8: Replace "2-5" with --2-15--.

Column 6, line 22: Between the words "preform" and "Under", insert a -- . --.

Signed and Sealed this

Twenty-fifth Day of July, 2000

Attest:

Q. TODD DICKINSON

Attesting Officer

Director of Patents and Trademarks